(12) United States Patent
Delson et al.

(10) Patent No.: US 10,812,486 B2
(45) Date of Patent: Oct. 20, 2020

(54) UTILIZING SMART DATA TAGS TO TRACK AND CONTROL SECURE ENTERPRISE DATA

(71) Applicant: Bank of America Corporation, Charlotte, NC (US)

(72) Inventors: Kevin A. Delson, Woodland Hills, CA (US); Crystal M. Sundaramoorthy, Charlotte, NC (US); Manu Kurian, Dallas, TX (US); Gopikrishna Nemalikanti, Frisco, TX (US); Jayachandra Varma, Irving, TX (US); Gilbert M. Gatchalian, Union, NJ (US)

(73) Assignee: Bank of America Corporation, Charlotte, NC (US)

( * ) Notice: Subject to any disclaimer, the term of this patent is extended or adjusted under 35 U.S.C. 154(b) by 156 days.

(21) Appl. No.: 16/210,542

(22) Filed: Dec. 5, 2018

(65) Prior Publication Data

US 2020/0186527 A1 Jun. 11, 2020

(51) Int. Cl.
*H04L 29/06* (2006.01)

(52) U.S. Cl.
CPC .................... *H04L 63/10* (2013.01)

(58) Field of Classification Search
CPC ...... G06F 21/6245; G06N 5/02; G06N 5/043; H04L 9/0894
USPC ............ 726/1, 2, 4, 24, 27; 380/20, 30, 201, 380/258, 270
See application file for complete search history.

(56) References Cited

U.S. PATENT DOCUMENTS

| | | |
|---|---|---|
| 8,086,534 B2 | 12/2011 | Powell |
| 8,595,058 B2 | 11/2013 | Fordyce, III et al. |
| 8,843,391 B2 | 9/2014 | Fordyce, III et al. |
| 9,507,984 B1 | 11/2016 | Kurian et al. |
| 9,563,873 B1 | 2/2017 | Kurian et al. |
| 9,691,085 B2 | 6/2017 | Scheidelman |
| 9,875,506 B2 | 1/2018 | Ghosh et al. |
| 9,910,905 B2 | 3/2018 | Wedgeworth, III |

(Continued)

OTHER PUBLICATIONS

"A Pattern Collection for Blockchain-based Applications"—Xu et al, Data 61, CSIRO, Jul. 8, 2018 http://pautasso.info/biblio-pdf/blockchain-europlop2018.pdf (Year: 2018).*

*Primary Examiner* — Randy A Scott
(74) *Attorney, Agent, or Firm* — Banner & Witcoff, Ltd.; Michael A. Springs

(57) ABSTRACT

Aspects of the disclosure relate to utilizing smart data tags to track and control secure enterprise data. A computing platform may receive, from an enterprise user computing device, enterprise data. Subsequently, the computing platform may determine one or more tags to be applied to the enterprise data. Then, the computing platform may generate a smart data object based on the enterprise data received from the enterprise user computing device and the one or more tags determined to be applied to the enterprise data received from the enterprise user computing device. Next, the computing platform may send, to an enterprise data storage platform, the smart data object, and sending the smart data object to the enterprise data storage platform may cause the enterprise data storage platform to store the smart data object in a repository comprising a plurality of smart data objects maintained by the enterprise data storage platform.

20 Claims, 10 Drawing Sheets

(56) References Cited

U.S. PATENT DOCUMENTS

| | | | |
|---|---|---|---|
| 10,621,511 B2* | 4/2020 | Saxena | G06N 20/00 |
| 10,643,288 B2* | 5/2020 | Orsini | G06Q 30/06 |
| 2014/0282974 A1* | 9/2014 | Maher | H04L 9/3271 |
| | | | 726/7 |
| 2017/0031963 A1 | 2/2017 | Merz et al. | |
| 2018/0129945 A1* | 5/2018 | Saxena | G06N 5/04 |
| 2018/0330290 A1 | 11/2018 | Mack et al. | |
| 2018/0330293 A1 | 11/2018 | Kulkarni et al. | |
| 2018/0330317 A1 | 11/2018 | Sepulveda et al. | |
| 2018/0330407 A1 | 11/2018 | Nagarajan | |
| 2018/0330827 A1 | 11/2018 | Johnson et al. | |
| 2018/0331995 A1 | 11/2018 | Naidu | |
| 2018/0332138 A1 | 11/2018 | Liu et al. | |
| 2018/0332434 A1 | 11/2018 | Kulkarni et al. | |
| 2018/0333612 A1 | 11/2018 | Davis | |
| 2018/0335965 A1 | 11/2018 | Kumarasamy | |
| 2018/0336027 A1 | 11/2018 | Narayanan et al. | |
| 2018/0336127 A1 | 11/2018 | Hutchison et al. | |
| 2018/0336129 A1 | 11/2018 | Hutchison et al. | |
| 2018/0336210 A1 | 11/2018 | Bourgeois et al. | |
| 2018/0336215 A1 | 11/2018 | Bitincka et al. | |
| 2018/0336348 A1 | 11/2018 | Ng et al. | |
| 2018/0336379 A1 | 11/2018 | Reynolds et al. | |
| 2018/0336518 A1 | 11/2018 | Kellogg | |
| 2018/0336568 A9 | 11/2018 | Gaikar et al. | |
| 2018/0336599 A1 | 11/2018 | Llewelyn | |
| 2018/0336723 A1 | 11/2018 | Elmer | |
| 2018/0336729 A1 | 11/2018 | Prideaux-Ghee et al. | |
| 2018/0336735 A1 | 11/2018 | Haines | |
| 2018/0337836 A1 | 11/2018 | Balabine et al. | |
| 2018/0337933 A1 | 11/2018 | Bacastow et al. | |
| 2018/0337958 A1 | 11/2018 | Nagarkar | |
| 2018/0337966 A1 | 11/2018 | Pearl et al. | |
| 2018/0338024 A1 | 11/2018 | Hardi | |
| 2018/0338120 A1 | 11/2018 | Lemberger et al. | |
| 2018/0340214 A1 | 11/2018 | Brzezinski et al. | |
| 2018/0341395 A1 | 11/2018 | Yaseen et al. | |
| 2018/0341396 A1 | 11/2018 | Yaseen et al. | |
| 2018/0341440 A1 | 11/2018 | Gennaro et al. | |
| 2018/0341631 A1 | 11/2018 | Verma | |
| 2018/0341701 A1 | 11/2018 | Verma et al. | |
| 2018/0341714 A1 | 11/2018 | Akolkar et al. | |
| 2018/0341760 A1 | 11/2018 | Frempong et al. | |
| 2018/0341811 A1 | 11/2018 | Bendale et al. | |
| 2018/0341839 A1 | 11/2018 | Malak et al. | |
| 2018/0341903 A1 | 11/2018 | Keen et al. | |
| 2018/0341904 A1 | 11/2018 | Aleman et al. | |
| 2018/0341915 A1 | 11/2018 | Narasimhan | |
| 2018/0341951 A1 | 11/2018 | Gaedoke et al. | |
| 2018/0342266 A1 | 11/2018 | Snell et al. | |
| 2018/0342317 A1 | 11/2018 | Skirble et al. | |
| 2018/0343117 A1 | 11/2018 | Nix | |
| 2018/0343222 A1 | 11/2018 | Le Jouan | |
| 2018/0343223 A1 | 11/2018 | Gaedoke et al. | |
| 2018/0343238 A1 | 11/2018 | Tola | |
| 2018/0343269 A1 | 11/2018 | Verma | |
| 2020/0005308 A1* | 1/2020 | Snyder | G06Q 20/4016 |

* cited by examiner

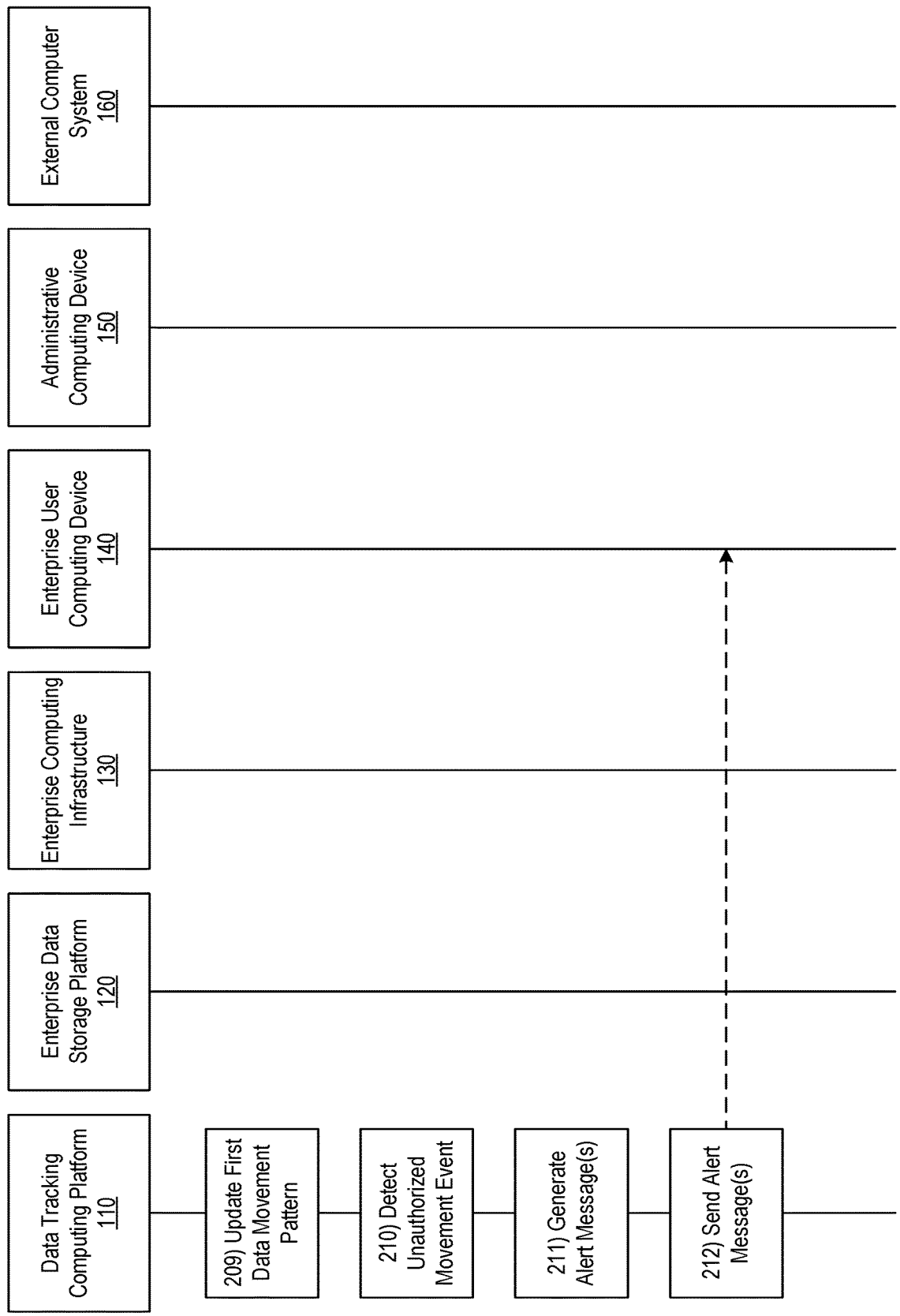

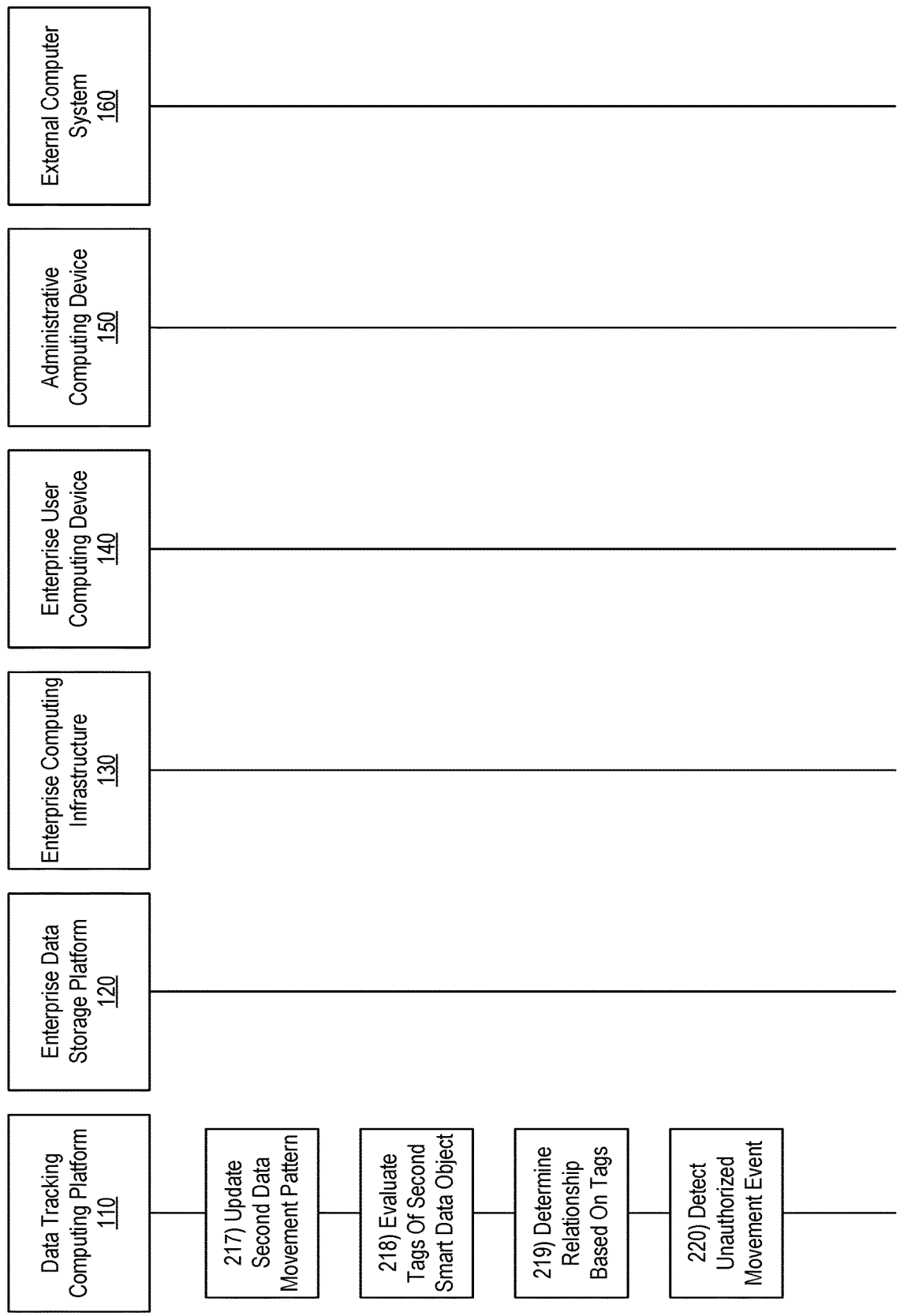

UTILIZING SMART DATA TAGS TO TRACK AND CONTROL SECURE ENTERPRISE DATA

BACKGROUND

Aspects of the disclosure relate to deploying digital data processing systems, providing information security, and preventing unauthorized access to resources of an information system. In particular, one or more aspects of the disclosure relate to preventing unauthorized access to information resources by utilizing smart data tags to track and control secure enterprise data.

Enterprise organizations may utilize various computing infrastructure to maintain large data sets, which may include confidential information and/or other sensitive data that is created and/or used for various purposes. In some instances, these large data sets may need to be accessed by and/or transferred across various networks and/or between various computer systems. Ensuring security when accessing and/or transferring such data may be critically important to protect the integrity and confidentiality of the underlying information. In many instances, however, it may be difficult to ensure the integrity and confidentiality of the information associated with the data sets while also attempting to optimize the resource utilization, bandwidth utilization, and efficient operations of the computing infrastructure involved in maintaining, accessing, and transferring the data.

SUMMARY

Aspects of the disclosure provide effective, efficient, scalable, and convenient technical solutions that address and overcome the technical problems associated with ensuring information security and preventing unauthorized access to resources of enterprise computer systems by utilizing smart data tags to track and control secure enterprise data.

In accordance with one or more embodiments, a computing platform having at least one processor, a communication interface, and memory may receive, via the communication interface, from an enterprise user computing device, first enterprise data. Subsequently, the computing platform may determine one or more tags to be applied to the first enterprise data received from the enterprise user computing device. Then, the computing platform may generate a first smart data object based on the first enterprise data received from the enterprise user computing device and the one or more tags determined to be applied to the first enterprise data received from the enterprise user computing device. Then, the computing platform may send, via the communication interface, to an enterprise data storage platform, the first smart data object. In addition, sending the first smart data object to the enterprise data storage platform may cause the enterprise data storage platform to store the first smart data object in a repository comprising a plurality of smart data objects maintained by the enterprise data storage platform.

In some embodiments, determining the one or more tags to be applied to the first enterprise data received from the enterprise user computing device may include identifying at least one tag to be applied to the first enterprise data received from the enterprise user computing device based on user-defined specifications received from the enterprise user computing device.

In some embodiments, determining the one or more tags to be applied to the first enterprise data received from the enterprise user computing device may include identifying at least one tag to be applied to the first enterprise data received from the enterprise user computing device based on contents of the first enterprise data received from the enterprise user computing device and one or more machine-learned tagging templates maintained by the computing platform.

In some embodiments, the one or more tags determined to be applied to the first enterprise data received from the enterprise user computing device may include at least one tag identifying a first computer system that created the first enterprise data and at least one tag identifying a second computer system that is authorized to access the first enterprise data.

In some embodiments, the one or more tags determined to be applied to the first enterprise data received from the enterprise user computing device may include at least one tag identifying a first network zone in which the first enterprise data was created and at least a second network zone in which the first enterprise data is authorized to be accessed.

In some embodiments, generating the first smart data object based on the first enterprise data received from the enterprise user computing device and the one or more tags determined to be applied to the first enterprise data received from the enterprise user computing device may include generating the first smart data object based on an object template defining a locator portion for storing unencrypted tag information and a payload portion for storing encrypted enterprise information.

In some embodiments, generating the first smart data object based on the first enterprise data received from the enterprise user computing device and the one or more tags determined to be applied to the first enterprise data received from the enterprise user computing device may include populating the locator portion of the first smart data object with the one or more tags determined to be applied to the first enterprise data received from the enterprise user computing device.

In some embodiments, generating the first smart data object based on the first enterprise data received from the enterprise user computing device and the one or more tags determined to be applied to the first enterprise data received from the enterprise user computing device may include: encrypting the first enterprise data received from the enterprise user computing device to produce encrypted enterprise data; and populating the payload portion of the first smart data object with the encrypted enterprise data.

In some embodiments, generating the first smart data object based on the first enterprise data received from the enterprise user computing device and the one or more tags determined to be applied to the first enterprise data received from the enterprise user computing device may include generating a sequence of linked objects associated with the first enterprise data received from the enterprise user computing device.

In some embodiments, the computing platform may update a first data movement pattern corresponding to the first smart data object based on sending the first smart data object to the enterprise data storage platform.

In some embodiments, the computing platform may receive, via the communication interface, from the enterprise data storage platform, a first movement notification indicating that the first smart data object is being transferred to enterprise computing infrastructure based on an access request. Subsequently, the computing platform may update the first data movement pattern corresponding to the first smart data object based on receiving the first movement notification indicating that the first smart data object is being transferred to the enterprise computing infrastructure based on the access request.

In some embodiments, the computing platform may detect an unauthorized movement event involving the first smart data object based on the first data movement pattern corresponding to the first smart data object.

In some embodiments, in response to detecting the unauthorized movement event involving the first smart data object, the computing platform may generate one or more alert messages comprising alert information associated with the unauthorized movement event involving the first smart data object. Subsequently, the computing platform may send, via the communication interface, to the enterprise user computing device, at least one alert message of the one or more alert messages.

In some embodiments, in response to detecting the unauthorized movement event involving the first smart data object, the computing platform may halt a transfer of the first smart data object.

In some embodiments, the computing platform may receive, via the communication interface, from the enterprise data storage platform, a second movement notification indicating that a second smart data object is being transferred from a first network location to a second network location based on a second access request, wherein the second smart data object is different from the first smart data object. Subsequently, the computing platform may update a second data movement pattern corresponding to the second smart data object based on receiving the second movement notification indicating that the second smart data object is being transferred from the first network location to the second network location based on the second access request.

In some embodiments, the computing platform may evaluate one or more tags associated with the second smart data object. Subsequently, the computing platform may determine that the one or more tags associated with the second smart data object are related to one or more tags associated with the first smart data object.

In some embodiments, the computing platform may detect an unauthorized movement event involving the second smart data object based on the first data movement pattern corresponding to the first smart data object.

In some embodiments, in response to detecting the unauthorized movement event involving the second smart data object, the computing platform may generate one or more alert messages comprising alert information associated with the unauthorized movement event involving the second smart data object. Subsequently, the computing platform may send, via the communication interface, to the enterprise user computing device, at least one alert message of the one or more alert messages. Then, the computing platform may halt a transfer of the second smart data object.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for preventing unauthorized access to information resources by utilizing smart data tags to track and control secure enterprise data in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using smart data to track, manage, and control the transmission and usage of entity-linked data. For example, a smart data system may tag data as it moves through an operating environment, so that an entity linked to the data (e.g., a bank customer associated with transaction record data) can know where such data exists, who can access it, who has accessed it, and for what purposes. In some instances, data may be tagged based on who interacts with it and where it is modified (e.g., if a user creates or interacts with data through the bank, it may be tagged as INT-XX, whereas if the user creates or interacts with data through another organization, it may be tagged as EXT-YY). When data is exchanged with another system/entity or commingled with other data having different tags, an alerting component of the smart data system may generate an alert or notification to the linked entity (i.e., the user who owns the data) regarding the exchange or commingling of the data. In some instances, blockchain technology may be used to record the owner of specific data, tags may be added to the record in the blockchain as different entities interact with the data, and the alerting component may monitor the blockchain to notify the owner of the data when it is accessed. This proactive monitoring, provided by the smart data system, may follow data wherever it goes. In some instances, the data may be encrypted as it moves between different systems, and the smart data system may have a key management component that centrally maintains the access key(s) required to decrypt and access the data from any destination system. In some instances, an artificial intelligence (AI) engine may be used to identify out-of-pattern attempts to access the data and trigger alerts for the data owner.

Figure 1A:
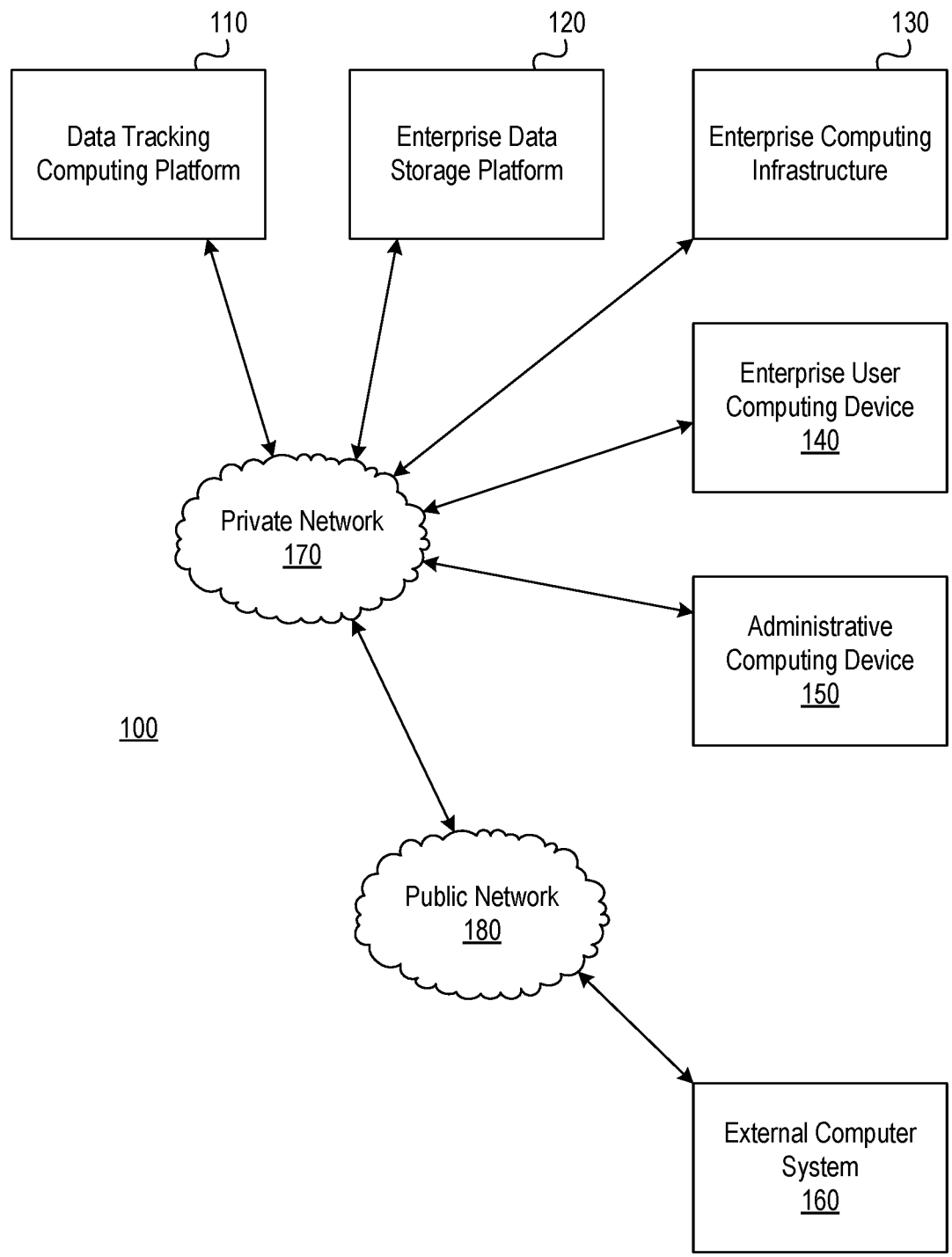
FIGS. 1A and 1B depict an illustrative computing environment for preventing unauthorized access to information resources by utilizing smart data tags to track and control secure enterprise data in accordance with one or more example embodiments.
Figure 1B:
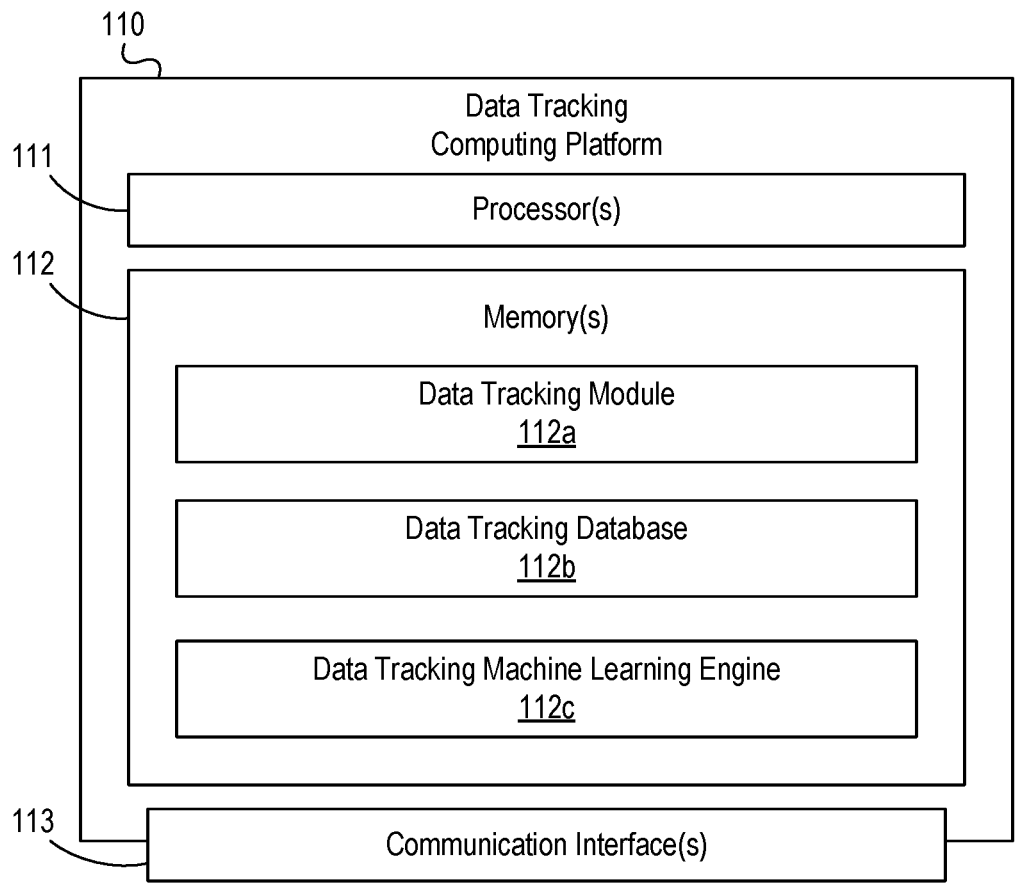

FIGS. 1A and 1B depict an illustrative computing environment for preventing unauthorized access to information resources by utilizing smart data tags to track and control secure enterprise data in accordance with one or more example embodiments. Referring to FIG. 1A, computing environment 100 may include one or more computer systems. For example, computing environment 100 may include a data tracking computing platform 110, an enterprise data storage platform 120, enterprise computing infrastructure 130, an enterprise user computing device 140, an administrative computing device 150, and an external computer system 160.

As illustrated in greater detail below, data tracking computing platform 110 may include one or more computing devices configured to perform one or more of the functions described herein. For example, data tracking computing platform 110 may include one or more computers (e.g., laptop computers, desktop computers, servers, server blades, or the like).

Enterprise data storage platform 120 may include one or more computing devices and/or other computer components (e.g., processors, memories, communication interfaces). In addition, and as illustrated in greater detail below, enterprise data storage platform 120 may be configured to store and/or otherwise maintain enterprise data. Enterprise computing infrastructure 130 may include one or more computing devices and/or other computer components (e.g., processors, memories, communication interfaces). In addition, and as illustrated in greater detail below, enterprise computing infrastructure 130 may be configured to provide various enterprise and/or back-office computing functions for an organization, such as a financial institution. For example, enterprise computing infrastructure 130 may include various servers and/or databases that store and/or otherwise maintain account information, such as financial account information including account balances, transaction history, account owner information, and/or other information. In addition, enterprise computing infrastructure 130 may process and/or otherwise execute transactions on specific accounts based on commands and/or other information received from other computer systems included in computing environment 100. Additionally or alternatively, enterprise computing infrastructure 130 may load data from enterprise data storage platform 120, manipulate and/or otherwise process such data, and return modified data and/or other data to enterprise data storage platform 120 and/or to other computer systems included in computing environment 100.

Enterprise user computing device 140 may be a personal computing device (e.g., desktop computer, laptop computer) or mobile computing device (e.g., smartphone, tablet). In addition, enterprise user computing device 140 may be linked to and/or used by a specific enterprise user (who may, e.g., be an employee or other affiliate of an enterprise organization operating data tracking computing platform 110). Administrative computing device 150 may be a personal computing device (e.g., desktop computer, laptop computer) or mobile computing device (e.g., smartphone, tablet). In addition, administrative computing device 150 may be linked to and/or used by an administrative user (who may, e.g., be a network administrator of an enterprise organization operating data tracking computing platform 110). External computer system 160 may include one or more computing devices and/or other computer components (e.g., processors, memories, communication interfaces). In addition, external computer system 160 may be linked to and/or used by one or more external users (who may, e.g., not be associated with an enterprise organization operating data tracking computing platform 110).

Computing environment 100 also may include one or more networks, which may interconnect one or more of data tracking computing platform 110, enterprise data storage platform 120, enterprise computing infrastructure 130, enterprise user computing device 140, administrative computing device 150, and external computer system 160. For example, computing environment 100 may include a private network 170 (which may, e.g., interconnect data tracking computing platform 110, enterprise data storage platform 120, enterprise computing infrastructure 130, enterprise user computing device 140, administrative computing device 150, and/or one or more other systems which may be associated with an organization, such as a financial institution) and public network 180 (which may, e.g., interconnect external computer system 160 with private network 170 and/or one or more other systems, public networks, subnetworks, and/or the like).

In one or more arrangements, enterprise data storage platform 120, enterprise computing infrastructure 130, enterprise user computing device 140, administrative computing device 150, external computer system 160, and/or the other systems included in computing environment 100 may be any type of computing device capable of receiving a user interface, receiving input via the user interface, and communicating the received input to one or more other computing devices. For example, enterprise data storage platform 120, enterprise computing infrastructure 130, enterprise user computing device 140, administrative computing device 150, external computer system 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of data tracking computing platform 110, enterprise data storage platform 120, enterprise computing infrastructure 130, enterprise user computing device 140, administrative computing device 150, and external computer system 160 may, in some instances, be special-purpose computing devices configured to perform specific functions.

Referring to FIG. 1B, data tracking computing platform 110 may include one or more processors 111, memory 112, and communication interface 113. A data bus may interconnect processor 111, memory 112, and communication interface 113. Communication interface 113 may be a network interface configured to support communication between data tracking computing platform 110 and one or more networks (e.g., network 170, network 180, or the like). Memory 112 may include one or more program modules having instructions that when executed by processor 111 cause data tracking computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of data tracking computing platform 110 and/or by different computing devices that may form and/or otherwise make up data tracking computing platform 110. For example, memory 112 may have, store, and/or include a data tracking module 112a, a data tracking database 112b, and a data tracking machine learning engine 112c. Data tracking module 112a may have instructions that direct and/or cause data tracking computing platform 110 to prevent unauthorized access to information resources by utilizing smart data tags to track and control secure enterprise data, as discussed in greater detail below. Data tracking database 112b may store information used by data tracking module 112a and/or data tracking computing platform 110 in preventing unauthorized access to information resources by utilizing smart data tags to track and control secure enterprise data. Data tracking machine learning engine 112c may build and/or update one or more data object models, one or more data movement patterns, and/or one or more other machine-learned models based on captured and/or received data.

Figure 2A:
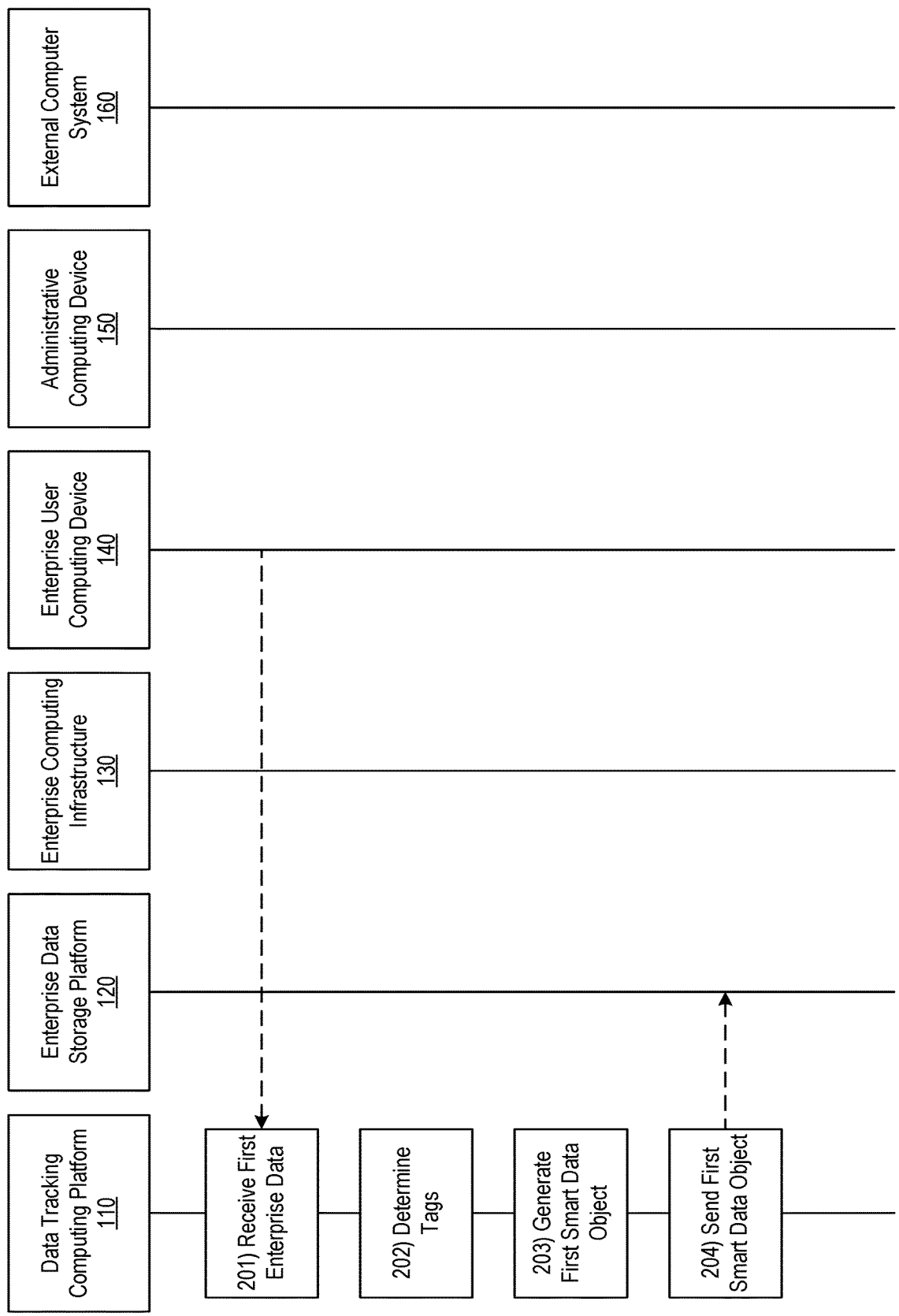

FIGS. 2A-2F depict an illustrative event sequence for preventing unauthorized access to information resources by utilizing smart data tags to track and control secure enterprise data in accordance with one or more example embodiments. Referring to FIG. 2A, at step 201, data tracking computing platform 110 may receive first enterprise data from enterprise user computing device 140. For example, at step 201, data tracking computing platform 110 may receive, via the communication interface (e.g., communication interface 113), from an enterprise user computing device (e.g., enterprise user computing device 140), first enterprise data. The first enterprise data received by data tracking computing platform 110 from enterprise user computing device 140 may, for instance, be and/or include transaction data, inventory data, personal data, user data, and/or other data. In some instances, the first enterprise data received by data tracking computing platform 110 from enterprise user computing device 140 may, for instance, be and/or include mortgage application data received by a financial institution from a loan applicant; such information may be securely maintained by the financial institution, and in some instances, select portions of this information might need to be shared within the financial institution and/or with other external parties, such as a settlement agent, insurance company, or the like.

At step 202, data tracking computing platform 110 may determine one or more tags to be applied to the first enterprise data. For example, at step 202, data tracking computing platform 110 may determine one or more tags to be applied to the first enterprise data received from the enterprise user computing device (e.g., enterprise user computing device 140).

In some embodiments, determining the one or more tags to be applied to the first enterprise data received from the enterprise user computing device may include identifying at least one tag to be applied to the first enterprise data received from the enterprise user computing device based on user-defined specifications received from the enterprise user computing device. For example, in determining the one or more tags to be applied to the first enterprise data received from the enterprise user computing device (e.g., enterprise user computing device 140), data tracking computing platform 110 may identify at least one tag to be applied to the first enterprise data received from the enterprise user computing device (e.g., enterprise user computing device 140) based on user-defined specifications received from the enterprise user computing device (e.g., enterprise user computing device 140). For instance, a user of enterprise user computing device 140 may specify one or more tags to be applied to the first enterprise data, and these specifications may be received by data tracking computing platform 110 and used by data tracking computing platform 110 to select and/or otherwise identify at least one tag to be applied to the first enterprise data.

In some embodiments, determining the one or more tags to be applied to the first enterprise data received from the enterprise user computing device may include identifying at least one tag to be applied to the first enterprise data received from the enterprise user computing device based on contents of the first enterprise data received from the enterprise user computing device and one or more machine-learned tagging templates maintained by the computing platform. For example, in determining the one or more tags to be applied to the first enterprise data received from the enterprise user computing device (e.g., enterprise user computing device 140), data tracking computing platform 110 may identify at least one tag to be applied to the first enterprise data received from the enterprise user computing device (e.g., enterprise user computing device 140) based on contents of the first enterprise data received from the enterprise user computing device (e.g., enterprise user computing device 140) and one or more machine-learned tagging templates maintained by the computing platform (e.g., data tracking computing platform 110). For instance, data tracking computing platform 110 may create, update, and/or use one or more machine-learned tagging templates based on past evaluation and/or tagging of other enterprise data, and these templates may be used by data tracking computing platform 110 in selecting and/or otherwise identifying at least one tag to be applied to the first enterprise data.

In some embodiments, the one or more tags determined to be applied to the first enterprise data received from the enterprise user computing device may include at least one tag identifying a first computer system that created the first enterprise data and at least one tag identifying a second computer system that is authorized to access the first enterprise data. For example, the one or more tags determined to be applied to the first enterprise data received from the enterprise user computing device (e.g., enterprise user computing device 140) by data tracking computing platform 110 at step 202 may include at least one tag identifying a first computer system that created the first enterprise data and at least one tag identifying a second computer system that is authorized to access the first enterprise data. For instance, data tracking computing platform 110 may determine to apply a tag identifying enterprise user computing device 140 as the computer system that created the first enterprise data and one or more additional tags identifying one or more other computer systems (e.g., administrative computing device 150, external computer system 160) that are authorized to access the first enterprise data.

In some embodiments, the one or more tags determined to be applied to the first enterprise data received from the enterprise user computing device may include at least one tag identifying a first network zone in which the first enterprise data was created and at least a second network zone in which the first enterprise data is authorized to be accessed. For example, the one or more tags determined to be applied to the first enterprise data received from the enterprise user computing device (e.g., enterprise user computing device 140) by data tracking computing platform 110 at step 202 may include at least one tag identifying a first network zone in which the first enterprise data was created and at least a second network zone in which the first enterprise data is authorized to be accessed. For instance, the different network zones may encompass different computer systems with different security levels and/or authentication requirements. In addition, these zone-based tags may help to improve information security and/or prevent data loss in enterprise organizations with highly sensitive information. For instance, intelligent firewalls operating in computing environment 100 may read these tags and prevent data from moving outside of permitted zones and/or report data movement events back to data tracking computing platform 110.

At step 203, data tracking computing platform 110 may generate a first smart data object (e.g., based on the one or more tags determined by data tracking computing platform 110 at step 202). For example, at step 203, data tracking computing platform 110 may generate a first smart data object based on the first enterprise data received from the enterprise user computing device (e.g., enterprise user computing device 140) and the one or more tags determined to be applied to the first enterprise data received from the enterprise user computing device (e.g., enterprise user computing device 140).

In some embodiments, generating the first smart data object based on the first enterprise data received from the enterprise user computing device and the one or more tags determined to be applied to the first enterprise data received from the enterprise user computing device may include generating the first smart data object based on an object template defining a locator portion for storing unencrypted tag information and a payload portion for storing encrypted enterprise information. For example, in generating the first smart data object based on the first enterprise data received from the enterprise user computing device (e.g., enterprise user computing device 140) and the one or more tags determined to be applied to the first enterprise data received from the enterprise user computing device (e.g., enterprise user computing device 140), data tracking computing platform 110 may generate the first smart data object based on an object template defining a locator portion for storing unencrypted tag information and a payload portion for storing encrypted enterprise information. For instance, data tracking computing platform 110 may maintain and/or use this object template for securely managing and storing enterprise data, such that the substantive enterprise data itself is encrypted, while the tags are kept readable and unencrypted on the outside of a secure container for the enterprise data. In some instances, the locator portion of the template and/or the object generated from the template may include a "call home" script that allows the object to communicate back to data tracking computing platform 110 if the object is transferred to a system that is not connected to an enterprise network associated with data tracking computing platform 110 or that does not have an enterprise monitoring node associated with the enterprise network associated with data tracking computing platform 110. In some instances, the object may have a quiet-mode setting that allows for reduced notifications (e.g., from such a call home script) and/or a self-destruct setting that allows for automatic deletion of secure data (e.g., within such a call home script, e.g., if the object is transferred to an unauthorized system or network location).

In some embodiments, generating the first smart data object based on the first enterprise data received from the enterprise user computing device and the one or more tags determined to be applied to the first enterprise data received from the enterprise user computing device may include populating the locator portion of the first smart data object with the one or more tags determined to be applied to the first enterprise data received from the enterprise user computing device. For example, in generating the first smart data object based on the first enterprise data received from the enterprise user computing device (e.g., enterprise user computing device 140) and the one or more tags determined to be applied to the first enterprise data received from the enterprise user computing device (e.g., enterprise user computing device 140), data tracking computing platform 110 may populate the locator portion of the first smart data object with the one or more tags determined to be applied to the first enterprise data received from the enterprise user computing device (e.g., enterprise user computing device 140).

In some embodiments, generating the first smart data object based on the first enterprise data received from the enterprise user computing device and the one or more tags determined to be applied to the first enterprise data received from the enterprise user computing device may include: encrypting the first enterprise data received from the enterprise user computing device to produce encrypted enterprise data; and populating the payload portion of the first smart data object with the encrypted enterprise data. For example, in generating the first smart data object based on the first enterprise data received from the enterprise user computing device (e.g., enterprise user computing device 140) and the one or more tags determined to be applied to the first enterprise data received from the enterprise user computing device (e.g., enterprise user computing device 140), data tracking computing platform 110 may encrypt the first enterprise data received from the enterprise user computing device (e.g., enterprise user computing device 140) to produce encrypted enterprise data. In addition, data tracking computing platform 110 may populate the payload portion of the first smart data object with the encrypted enterprise data.

In some embodiments, generating the first smart data object based on the first enterprise data received from the enterprise user computing device and the one or more tags determined to be applied to the first enterprise data received from the enterprise user computing device may include generating a sequence of linked objects associated with the first enterprise data received from the enterprise user computing device. For example, in generating the first smart data object based on the first enterprise data received from the enterprise user computing device (e.g., enterprise user computing device 140) and the one or more tags determined to be applied to the first enterprise data received from the enterprise user computing device (e.g., enterprise user computing device 140), data tracking computing platform 110 may generate a sequence of linked objects associated with the first enterprise data received from the enterprise user computing device (e.g., enterprise user computing device 140). For instance, data tracking computing platform 110 may generate a plurality of linked objects based on receiving enterprise data that includes a relatively large data set or a sequence of linked data blocks. Each object in the sequence may, for instance, be linked to preceding and/or subsequent blocks, and these objects in the sequence all may have the same and/or similar tags but different payloads. Information identifying the sequence and/or linking the objects may, for instance, be inserted into the locator portion of each object by data tracking computing platform 110 so that the objects can be rearranged in their correct sequence if there are transferred between systems in a different order.

At step 204, data tracking computing platform 110 may send the first smart data object to enterprise data storage platform 120. For example, at step 204, data tracking computing platform 110 may send, via the communication interface (e.g., communication interface 113), to an enterprise data storage platform (e.g., enterprise data storage platform 120), the first smart data object. In addition, by sending the first smart data object to the enterprise data storage platform (e.g., enterprise data storage platform 120), data tracking computing platform 110 may cause the enterprise data storage platform (e.g., enterprise data storage platform 120) to store the first smart data object in a repository comprising a plurality of smart data objects maintained by the enterprise data storage platform (e.g., enterprise data storage platform 120).

Figure 2B:
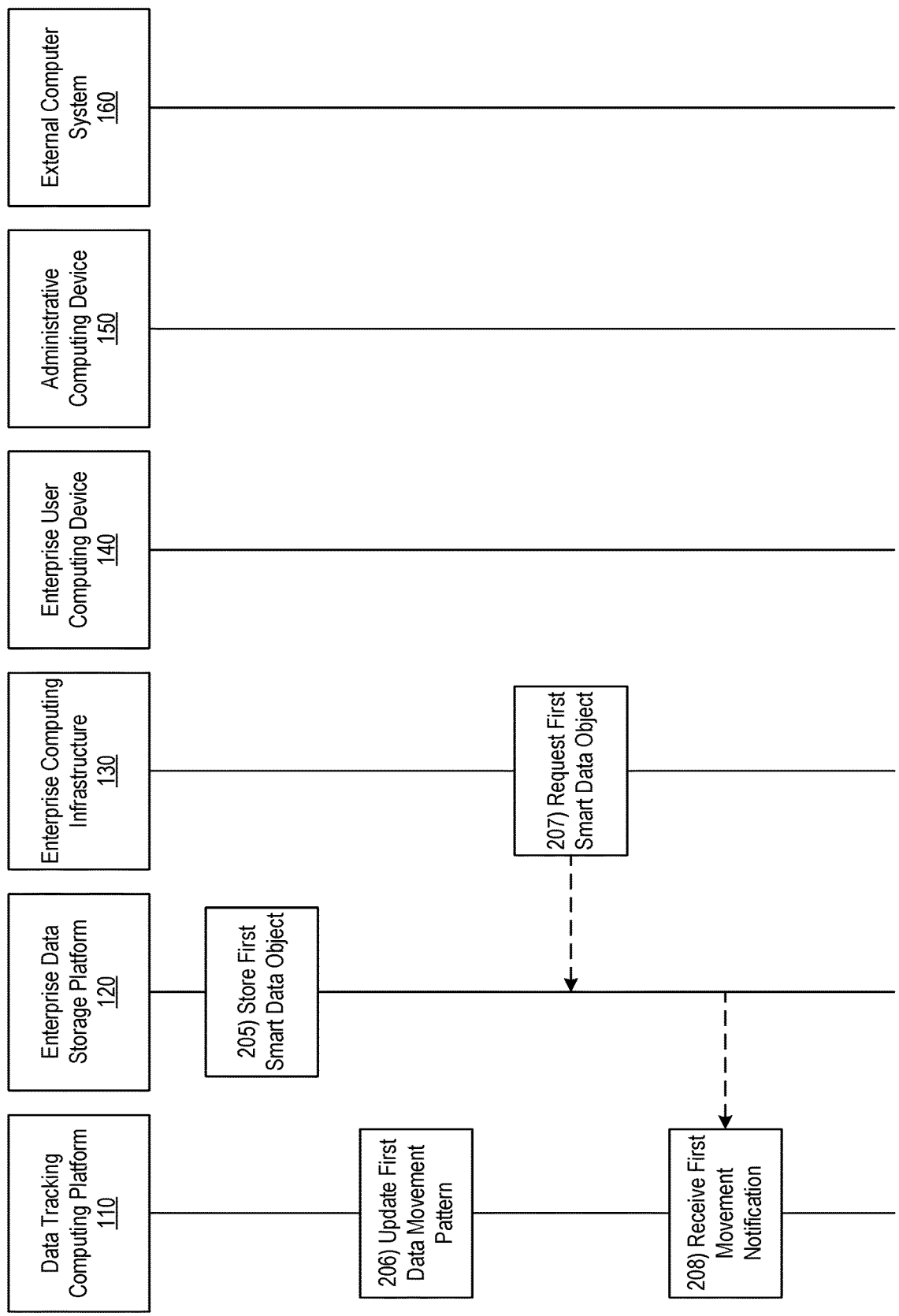

Referring to FIG. 2B, at step 205, enterprise data storage platform 120 may store the first smart data object in a repository that includes a plurality of smart data objects maintained by enterprise data storage platform 120 (e.g., based on and/or in response to receiving the first smart data object from data tracking computing platform 110). At step 206, data tracking computing platform 110 may update a first data movement pattern associated with the first smart data object. For example, at step 206, data tracking computing platform 110 may update a first data movement pattern corresponding to the first smart data object based on sending the first smart data object to the enterprise data storage platform (e.g., enterprise data storage platform 120). For instance, data tracking computing platform 110 may update a first data movement pattern corresponding to the first smart data object to indicate that the first smart data object was created based on enterprise data received from enterprise user computing device 140 and stored with enterprise data storage platform 120. As this data object moves through the computing environment, the data movement pattern may, for instance, track where the object has been and where it is going; in addition, data tracking computing platform 110 may record the data movement pattern in a blockchain maintained by data tracking computing platform 110, along with one or more other data movement patterns for other data objects. Thus, data tracking computing platform 110 may track the movement of data as well as how different objects with different tags move through the computing environment, which may enable data tracking computing platform 110 to identify future out-of-pattern data movement events, as illustrated below.

At step 207, enterprise computing infrastructure 130 may request the first smart data object from enterprise data storage platform 120. For instance, at step 207, enterprise computing infrastructure 130 may receive an access request (e.g., from a user of enterprise computing infrastructure 130 and/or another system included in computing environment 100, such as enterprise user computing device 140, administrative computing device 150, external computer system 160) and may send a request to enterprise data storage platform 120 for the first smart data object based on the access request.

At step 208, data tracking computing platform 110 may receive, from enterprise data storage platform 120, a first movement notification (which may, e.g., be generated by enterprise data storage platform 120 based on receiving the request for the first smart data object from enterprise computing infrastructure 130). For example, at step 208, data tracking computing platform 110 may receive, via the communication interface (e.g., communication interface 113), from the enterprise data storage platform (e.g., enterprise data storage platform 120), a first movement notification indicating that the first smart data object is being transferred to enterprise computing infrastructure (e.g., enterprise computing infrastructure 130) based on an access request. For instance, the first movement notification received by data tracking computing platform 110 may indicate that the first smart data object is being transferred to enterprise computing infrastructure 130 for manipulation based on an access request received from one or more other enterprise devices and/or non-enterprise devices.

Referring to FIG. 2C, at step 209, data tracking computing platform 110 may update the first data movement pattern (e.g., based on the movement notification received from enterprise data storage platform 120). For example, at step 209, data tracking computing platform 110 may update the first data movement pattern corresponding to the first smart data object based on receiving the first movement notification indicating that the first smart data object is being transferred to the enterprise computing infrastructure (e.g., enterprise computing infrastructure 130) based on the access request. For instance, data tracking computing platform 110 may add information to the first data movement pattern corresponding to the first smart data object to indicate that the first smart data object is being transferred to enterprise computing infrastructure 130 based on the access request. As data objects move in the computing environment, recipient systems and/or monitoring nodes deployed on such systems may report the arrival and/or presence of specific data objects back to data tracking computing platform 110, for instance, by sending messages with object identifiers and/or tag information pulled from the locator portions of corresponding objects back to data tracking computing platform 110.

At step 210, data tracking computing platform 110 may detect an unauthorized movement event. For example, at step 210, data tracking computing platform 110 may detect an unauthorized movement event involving the first smart data object based on the first data movement pattern corresponding to the first smart data object. For instance, data tracking computing platform 110 may detect the unauthorized movement event involving the first smart data object based on determining that the recently received movement notification is out of pattern for the first smart data object and/or for similar data objects having similar tags as the first smart data object (e.g., based on one or more movement patterns of such similar objects having similar tags).

Figure 3:
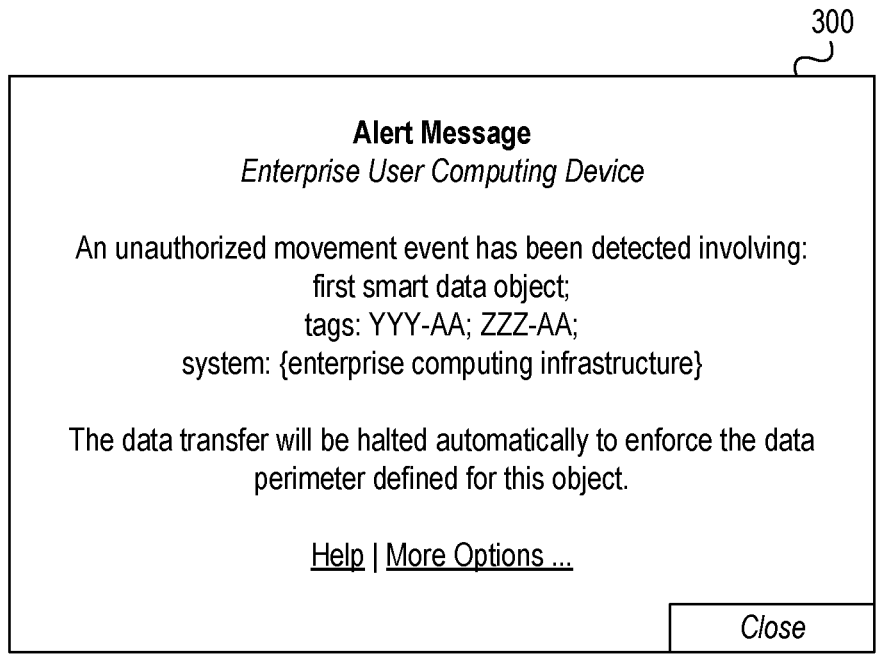
FIGS. 3 and 4 depict example graphical user interfaces for preventing unauthorized access to information resources by utilizing smart data tags to track and control secure enterprise data in accordance with one or more example embodiments.

At step 211, data tracking computing platform 110 may generate one or more alert messages. For example, at step 211, in response to detecting the unauthorized movement event involving the first smart data object, data tracking computing platform 110 may generate one or more alert messages comprising alert information associated with the unauthorized movement event involving the first smart data object. At step 212, data tracking computing platform 110 may send one or more alert messages to enterprise user computing device 140. For example, at step 212, data tracking computing platform 110 may send, via the communication interface (e.g., communication interface 113), to the enterprise user computing device (e.g., enterprise user computing device 140), at least one alert message of the one or more alert messages. By sending the at least one alert message of the one or more alert messages to enterprise user computing device 140, data tracking computing platform 110 may cause enterprise user computing device 140 to display and/or otherwise present a graphical user interface similar to graphical user interface 300, which is depicted in FIG. 3. As seen in FIG. 3, graphical user interface 300 may include text and/or other information identifying the detected unauthorized movement event (e.g., "An unauthorized movement event has been detected involving: first smart data object; tags: YYY-AA; ZZZ-AA; system: {enterprise computing infrastructure}") and/or information identifying one or more remedial actions (e.g., "The data transfer will be halted automatically to enforce the data perimeter defined for this object.").

Figure 2D:
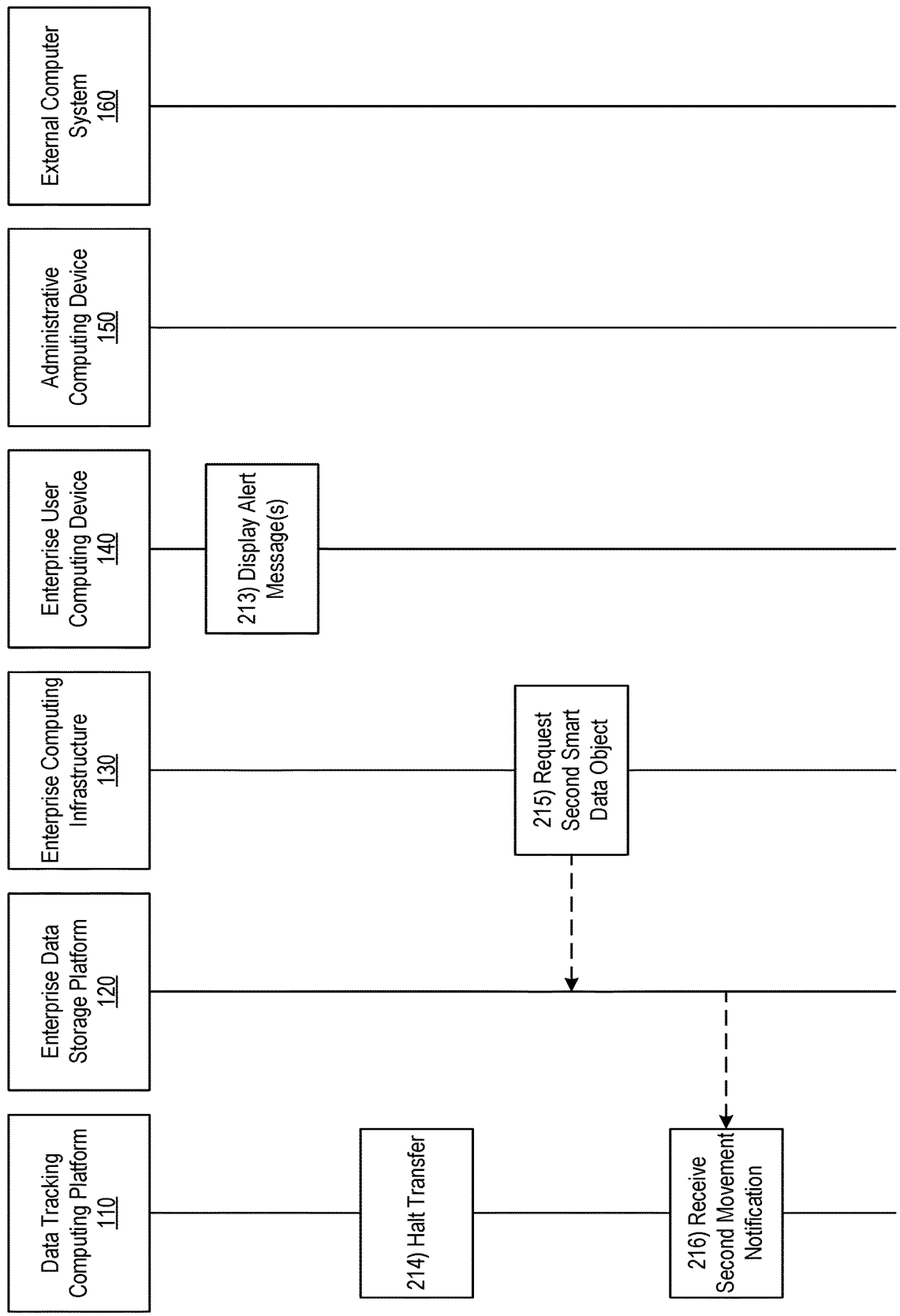

Referring to FIG. 2D, at step 213, enterprise user computing device 140 may display the one or more alert messages received from data tracking computing platform 110. For instance, at step 213, enterprise user computing device 140 may display and/or otherwise present graphical user interface 300.

At step 214, data tracking computing platform 110 may halt the transfer of the first smart data object. For example, at step 214, in response to detecting the unauthorized movement event involving the first smart data object, data tracking computing platform 110 may halt a transfer of the first smart data object. For instance, after data tracking computing platform 110 detects that the data movement associated with the unauthorized movement event involving the first smart data object is out of pattern or that secure data has arrived at the wrong endpoint, data tracking computing platform 110 may halt the data transfer and/or reroute or move the data to the correct system (e.g., by generating and/or sending one or more commands to intermediary and/or endpoint systems to stop an in-progress transfer, terminate one or more connections, and/or execute other functions).

At step 215, enterprise computing infrastructure 130 may request a second smart data object from enterprise data storage platform 120. For instance, at step 215, enterprise computing infrastructure 130 may receive an access request (e.g., from a user of enterprise computing infrastructure 130 and/or another system included in computing environment 100, such as enterprise user computing device 140, administrative computing device 150, external computer system 160) and may send a request to enterprise data storage platform 120 for the second smart data object based on the access request.

At step 216, data tracking computing platform 110 may receive, from enterprise data storage platform 120, a second movement notification (which may, e.g., be generated by enterprise data storage platform 120 based on receiving the request for the second smart data object from enterprise computing infrastructure 130). For example, at step 216, data tracking computing platform 110 may receive, via the communication interface (e.g., communication interface 113), from the enterprise data storage platform (e.g., enterprise data storage platform 120), a second movement notification indicating that a second smart data object is being transferred from a first network location to a second network location based on a second access request. In addition, the second smart data object may be different from the first smart data object. For instance, the second movement notification received by data tracking computing platform 110 may indicate that the second smart data object is being transferred to enterprise computing infrastructure 130 for manipulation based on an access request received from one or more other enterprise devices and/or non-enterprise devices.

Referring to FIG. 2E, at step 217, data tracking computing platform 110 may update the second data movement pattern (e.g., based on the movement notification received from enterprise data storage platform 120). For example, at step 217, data tracking computing platform 110 may update a second data movement pattern corresponding to the second smart data object based on receiving the second movement notification indicating that the second smart data object is being transferred from the first network location to the second network location based on the second access request. For instance, data tracking computing platform 110 may add information to the second data movement pattern corresponding to the second smart data object to indicate that the second smart data object is being transferred from the first network location to the second network location based on the second access request. As data objects move in the computing environment, recipient systems and/or monitoring nodes deployed on such systems may report the arrival and/or presence of specific data objects back to data tracking computing platform 110, for instance, by sending messages with object identifiers and/or tag information pulled from the locator portions of corresponding objects back to data tracking computing platform 110.

At step 218, data tracking computing platform 110 may evaluate one or more tags of the second smart data object. For example, at step 218, data tracking computing platform 110 may evaluate one or more tags associated with the second smart data object. At step 219, data tracking computing platform 110 may determine one or more relationships associated with the second smart data object based on the one or more tags associated with the second smart data object. For example, at step 219, data tracking computing platform 110 may determine that the one or more tags associated with the second smart data object are related to one or more tags associated with the first smart data object. In determining that the one or more tags associated with the second smart data object are related to one or more tags associated with the first smart data object, data tracking computing platform 110 may recognize, identify, and/or otherwise determine that more than a predetermined threshold number of tags associated with the second smart data object match corresponding tags associated with the first smart data object. Such a threshold may, for instance, be a seventy-five percent match in some instances.

At step 220, data tracking computing platform 110 may detect an unauthorized movement event. For example, at step 220, data tracking computing platform 110 may detect an unauthorized movement event involving the second smart data object based on the first data movement pattern corresponding to the first smart data object. For instance, data tracking computing platform 110 may detect the unauthorized movement event involving the second smart data object based on determining that the recently received movement notification is out of pattern for the second smart data object in view of the first data movement pattern corresponding to the first smart data object. For instance, because both of these data objects and other data objects in the computing environment are tagged with identifiers, data tracking computing platform 110 and its machine learning engine may track types of data objects moving in specific patterns. This tracking may, for instance, enable data tracking computing platform 110 to generate alerts when similar types of data are moving in directions that are out of alignment with patterns for those types of data.

Figure 2F:
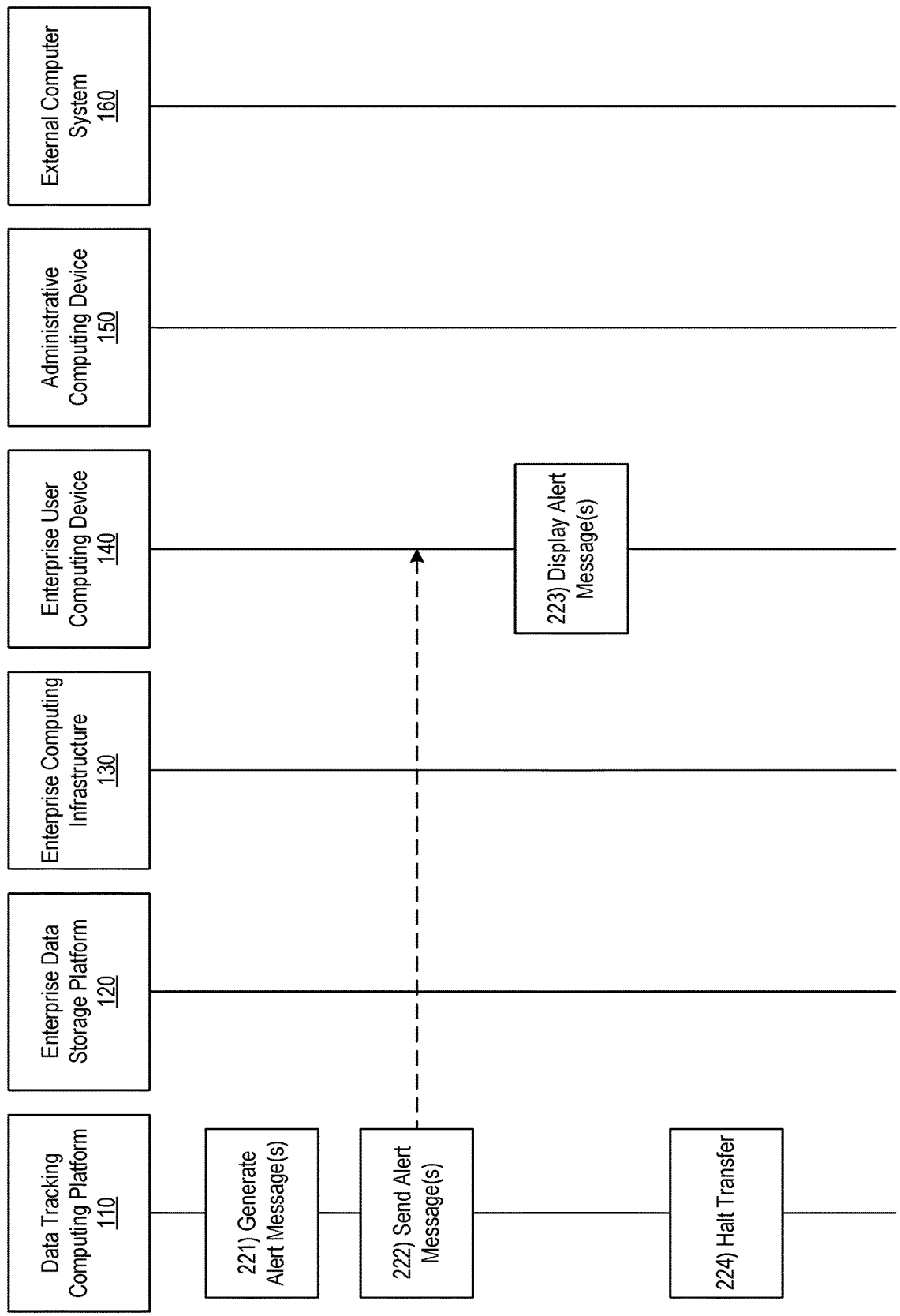
Figure 4:
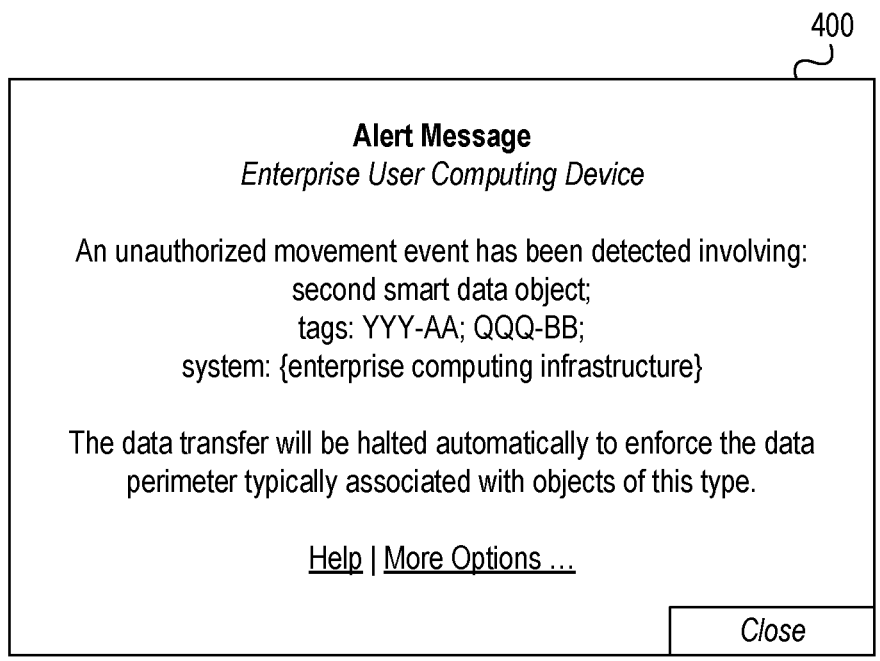

Referring to FIG. 2F, at step 221, data tracking computing platform 110 may generate one or more alert messages. For example, at step 221, in response to detecting the unauthorized movement event involving the second smart data object, data tracking computing platform 110 may generate one or more alert messages comprising alert information associated with the unauthorized movement event involving the second smart data object. At step 222, data tracking computing platform 110 may send one or more alert messages to enterprise user computing device 140. For example, at step 222, data tracking computing platform 110 may send, via the communication interface (e.g., communication interface 113), to the enterprise user computing device (e.g., enterprise user computing device 140), at least one alert message of the one or more alert messages. By sending the at least one alert message of the one or more alert messages to enterprise user computing device 140, data tracking computing platform 110 may cause enterprise user computing device 140 to display and/or otherwise present a graphical user interface similar to graphical user interface 400, which is depicted in FIG. 4. As seen in FIG. 4, graphical user interface 400 may include text and/or other information identifying the detected unauthorized movement event (e.g., "An unauthorized movement event has been detected involving: second smart data object; tags: YYY-AA; QQQ-BB; system: {enterprise computing infrastructure}") and/or information identifying one or more remedial actions (e.g., "The data transfer will be halted automatically to enforce the data perimeter typically associated with objects of this type.").

At step 223, enterprise user computing device 140 may display the one or more alert messages received from data tracking computing platform 110. For instance, at step 223, enterprise user computing device 140 may display and/or otherwise present graphical user interface 400. At step 224, data tracking computing platform 110 may halt a transfer of the second smart data object. For instance, after data tracking computing platform 110 detects that the data movement associated with the unauthorized movement event involving the second smart data object is out of pattern or that secure data has arrived at the wrong endpoint, data tracking computing platform 110 may halt the data transfer and/or reroute or move the data to the correct system (e.g., by generating and/or sending one or more commands to intermediary and/or endpoint systems to stop an in-progress transfer, terminate one or more connections, and/or execute other functions).

Figure 5:
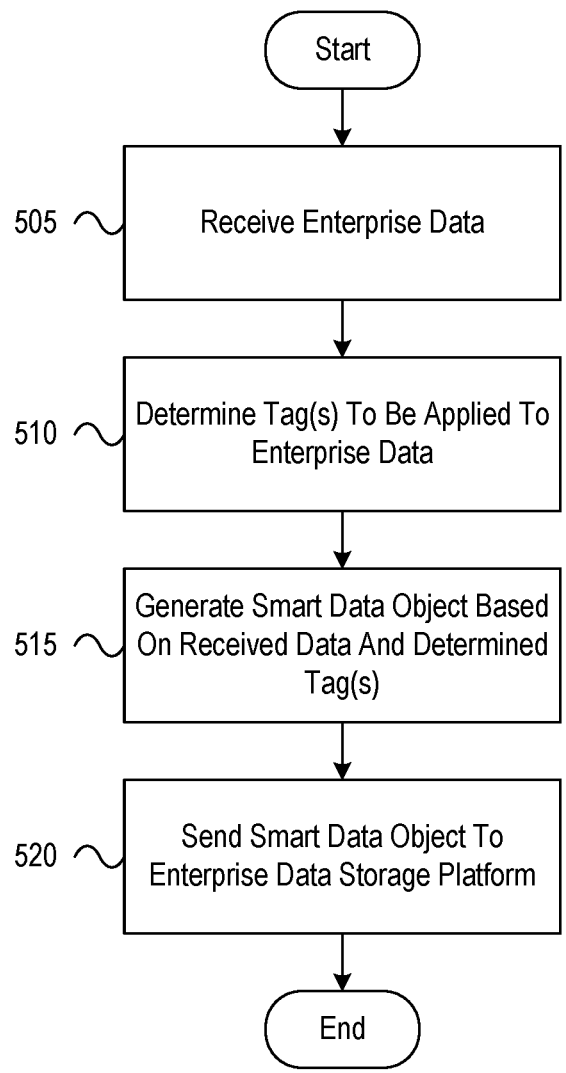
FIG. 5 depicts an illustrative method for preventing unauthorized access to information resources by utilizing smart data tags to track and control secure enterprise data in accordance with one or more example embodiments.

FIG. 5 depicts an illustrative method for preventing unauthorized access to information resources by utilizing smart data tags to track and control secure enterprise data in accordance with one or more example embodiments. Referring to FIG. 5, at step 505, a computing platform having at least one processor, a communication interface, and memory may receive, via the communication interface, from an enterprise user computing device, first enterprise data. At step 510, the computing platform may determine one or more tags to be applied to the first enterprise data received from the enterprise user computing device. At step 515, the computing platform may generate a first smart data object based on the first enterprise data received from the enterprise user computing device and the one or more tags determined to be applied to the first enterprise data received from the enterprise user computing device. At step 520, the computing platform may send, via the communication interface, to an enterprise data storage platform, the first smart data object, and sending the first smart data object to the enterprise data storage platform may cause the enterprise data storage platform to store the first smart data object in a repository comprising a plurality of smart data objects maintained by the enterprise data storage platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
     receive, via the communication interface, from an enterprise user computing device, first enterprise data;
     determine one or more tags to be applied to the first enterprise data received from the enterprise user computing device;
     generate a first smart data object based on the first enterprise data received from the enterprise user computing device and the one or more tags determined to be applied to the first enterprise data received from the enterprise user computing device wherein generating the first smart data object based on the first enterprise data received from the enterprise user computing device and the one or more tags determined to be applied to the first enterprise data received from the enterprise user computing device comprises generating the first smart data object based on an object template defining a locator portion for storing unencrypted tag information and a payload portion for storing encrypted enterprise information; and send, via the communication interface, to an enterprise data storage platform, the first smart data object, wherein sending the first smart data object to the enterprise data storage platform causes the enterprise data storage platform to store the first smart data object in a repository comprising a plurality of smart data objects maintained by the enterprise data storage platform.

2. The computing platform of claim 1, wherein determining the one or more tags to be applied to the first enterprise data received from the enterprise user computing device comprises identifying at least one tag to be applied to the first enterprise data received from the enterprise user computing device based on user-defined specifications received from the enterprise user computing device.

3. The computing platform of claim 1, wherein determining the one or more tags to be applied to the first enterprise data received from the enterprise user computing device comprises identifying at least one tag to be applied to the first enterprise data received from the enterprise user computing device based on contents of the first enterprise data received from the enterprise user computing device and one or more machine-learned tagging templates maintained by the computing platform.

4. The computing platform of claim 1, wherein the one or more tags determined to be applied to the first enterprise data received from the enterprise user computing device comprise at least one tag identifying a first computer system that created the first enterprise data and at least one tag identifying a second computer system that is authorized to access the first enterprise data.

5. The computing platform of claim 1, wherein the one or more tags determined to be applied to the first enterprise data received from the enterprise user computing device comprise at least one tag identifying a first network zone in which the first enterprise data was created and at least a second network zone in which the first enterprise data is authorized to be accessed.

6. The computing platform of claim 1, wherein generating the first smart data object based on the first enterprise data received from the enterprise user computing device and the one or more tags determined to be applied to the first enterprise data received from the enterprise user computing device comprises populating the locator portion of the first smart data object with the one or more tags determined to be applied to the first enterprise data received from the enterprise user computing device.

7. The computing platform of claim 1, wherein generating the first smart data object based on the first enterprise data received from the enterprise user computing device and the one or more tags determined to be applied to the first enterprise data received from the enterprise user computing device comprises:

encrypting the first enterprise data received from the enterprise user computing device to produce encrypted enterprise data; and populating the payload portion of the first smart data object with the encrypted enterprise data.

8. The computing platform of claim 1, wherein generating the first smart data object based on the first enterprise data received from the enterprise user computing device and the one or more tags determined to be applied to the first enterprise data received from the enterprise user computing device comprises generating a sequence of linked objects associated with the first enterprise data received from the enterprise user computing device.

9. The computing platform of claim 1, wherein the memory stores additional computer-readable instructions that, when executed by the at least one processor, cause the computing platform to:

update a first data movement pattern corresponding to the first smart data object based on sending the first smart data object to the enterprise data storage platform.

10. The computing platform of claim 9, wherein the memory stores additional computer-readable instructions that, when executed by the at least one processor, cause the computing platform to:

receive, via the communication interface, from the enterprise data storage platform, a first movement notification indicating that the first smart data object is being transferred to enterprise computing infrastructure based on an access request; and update the first data movement pattern corresponding to the first smart data object based on receiving the first movement notification indicating that the first smart data object is being transferred to the enterprise computing infrastructure based on the access request.

11. The computing platform of claim 10, wherein the memory stores additional computer-readable instructions that, when executed by the at least one processor, cause the computing platform to:

detect an unauthorized movement event involving the first smart data object based on the first data movement pattern corresponding to the first smart data object.

12. The computing platform of claim 11, wherein the memory stores additional computer-readable instructions that, when executed by the at least one processor, cause the computing platform to:

in response to detecting the unauthorized movement event involving the first smart data object, generate one or more alert messages comprising alert information associated with the unauthorized movement event involving the first smart data object; and send, via the communication interface, to the enterprise user computing device, at least one alert message of the one or more alert messages.

13. The computing platform of claim 11, wherein the memory stores additional computer-readable instructions that, when executed by the at least one processor, cause the computing platform to:

in response to detecting the unauthorized movement event involving the first smart data object, halt a transfer of the first smart data object.

14. The computing platform of claim 10, wherein the memory stores additional computer-readable instructions that, when executed by the at least one processor, cause the computing platform to:

receive, via the communication interface, from the enterprise data storage platform, a second movement notification indicating that a second smart data object is being transferred from a first network location to a second network location based on a second access request, wherein the second smart data object is different from the first smart data object; and update a second data movement pattern corresponding to the second smart data object based on receiving the second movement notification indicating that the second smart data object is being transferred from the first network location to the second network location based on the second access request.

15. The computing platform of claim 14, wherein the memory stores additional computer-readable instructions that, when executed by the at least one processor, cause the computing platform to:

evaluate one or more tags associated with the second smart data object; and determine that the one or more tags associated with the second smart data object are related to one or more tags associated with the first smart data object.

16. The computing platform of claim 15, wherein the memory stores additional computer-readable instructions that, when executed by the at least one processor, cause the computing platform to:

detect an unauthorized movement event involving the second smart data object based on the first data movement pattern corresponding to the first smart data object.

17. The computing platform of claim 16, wherein the memory stores additional computer-readable instructions that, when executed by the at least one processor, cause the computing platform to:

in response to detecting the unauthorized movement event involving the second smart data object, generate one or more alert messages comprising alert information associated with the unauthorized movement event involving the second smart data object;

send, via the communication interface, to the enterprise user computing device, at least one alert message of the one or more alert messages; and halt a transfer of the second smart data object.

18. A method, comprising:

at a computing platform comprising at least one processor, a communication interface, and memory:

receiving, by the at least one processor, via the communication interface, from an enterprise user computing device, first enterprise data;

determining, by the at least one processor, one or more tags to be applied to the first enterprise data received from the enterprise user computing device;

generating, by the at least one processor, a first smart data object based on the first enterprise data received from the enterprise user computing device and the one or more tags determined to be applied to the first enterprise data received from the enterprise user computing device, wherein generating the first smart data object based on the first enterprise data received from the enterprise user computing device and the one or more tags determined to be applied to the first enterprise data received from the enterprise user computing device comprises generating the first smart data object based on an object template defining a locator portion for storing unencrypted tag information and a payload portion for storing encrypted enterprise information; and sending, by the at least one processor, via the communication interface, to an enterprise data storage platform, the first smart data object, wherein sending the first smart data object to the enterprise data storage platform causes the enterprise data storage platform to store the first smart data object in a repository comprising a plurality of smart data objects maintained by the enterprise data storage platform.

19. One or more non-transitory computer-readable media storing instructions that, when executed by a computing platform comprising at least one processor, a communication interface, and memory, cause the computing platform to:

receive, via the communication interface, from an enterprise user computing device, first enterprise data;

determine one or more tags to be applied to the first enterprise data received from the enterprise user computing device;

generate a first smart data object based on the first enterprise data received from the enterprise user computing device and the one or more tags determined to be applied to the first enterprise data received from the enterprise user computing device, wherein generating the first smart data object based on the first enterprise data received from the enterprise user computing device and the one or more tags determined to be applied to the first enterprise data received from the enterprise user computing device comprises generating the first smart data object based on an object template defining a locator portion for storing unencrypted tag information and a payload portion for storing encrypted enterprise information; and send, via the communication interface, to an enterprise data storage platform, the first smart data object, wherein sending the first smart data object to the enterprise data storage platform causes the enterprise data storage platform to store the first smart data object in a repository comprising a plurality of smart data objects maintained by the enterprise data storage platform.

20. The method of claim 18, wherein generating the first smart data object based on the first enterprise data received from the enterprise user computing device and the one or more tags determined to be applied to the first enterprise data received from the enterprise user computing device comprises populating the locator portion of the first smart data object with the one or more tags determined to be applied to the first enterprise data received from the enterprise user computing device.

* * * * *

UNITED STATES PATENT AND TRADEMARK OFFICE
CERTIFICATE OF CORRECTION

PATENT NO. : 10,812,486 B2
APPLICATION NO. : 16/210542
DATED : October 20, 2020
INVENTOR(S) : Delson et al.

Page 1 of 1

It is certified that error appears in the above-identified patent and that said Letters Patent is hereby corrected as shown below:

In the Claims

Column 17, Line 3:
In Claim 1, after "device", insert --,--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*